United States Patent
Kitamura et al.

(10) Patent No.: US 12,119,867 B2
(45) Date of Patent: Oct. 15, 2024

(54) TRANSMISSION APPARATUS AND TRANSMISSION METHOD

(71) Applicant: NIPPON TELEGRAPH AND TELEPHONE CORPORATION, Tokyo (JP)

(72) Inventors: Kei Kitamura, Musashino (JP); Fumikazu Inuzuka, Musashino (JP); Kengo Shintaku, Musashino (JP); Takuya Oda, Musashino (JP); Takafumi Tanaka, Musashino (JP); Masahito Tomizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 4 days.

(21) Appl. No.: 17/632,589

(22) PCT Filed: Aug. 5, 2019

(86) PCT No.: PCT/JP2019/030680
§ 371 (c)(1),
(2) Date: Feb. 3, 2022

(87) PCT Pub. No.: WO2021/024346
PCT Pub. Date: Feb. 11, 2021

(65) Prior Publication Data
US 2022/0321210 A1    Oct. 6, 2022

(51) Int. Cl.
*H04B 10/032*    (2013.01)
*H04B 10/079*    (2013.01)

(52) U.S. Cl.
CPC ....... *H04B 10/032* (2013.01); *H04B 10/0795* (2013.01)

(58) Field of Classification Search
CPC .......... H04B 10/03–0799; H04J 14/0287–0297
USPC ............................................ 398/1–8, 17, 25
See application file for complete search history.

(56) References Cited

U.S. PATENT DOCUMENTS

| | | | | |
|---|---|---|---|---|
| 6,072,610 | A * | 6/2000 | Kuroyanagi | H04Q 11/0478 398/1 |
| 6,515,962 | B1 * | 2/2003 | Sawey | H04J 3/0623 370/227 |
| 7,787,364 | B2 | 8/2010 | Maeda et al. | |
| 2001/0021045 | A1 * | 9/2001 | Tervonen | H04B 10/07955 398/5 |
| 2003/0120983 | A1 | 6/2003 | Vieregge et al. | |
| 2004/0114925 | A1 * | 6/2004 | Berthold | H04J 14/0294 398/45 |

(Continued)

FOREIGN PATENT DOCUMENTS

| | | | | |
|---|---|---|---|---|
| EP | 3410615 A1 | 12/2018 | | |
| JP | 11068656 | * 3/1999 | | H04B 10/02 |

(Continued)

OTHER PUBLICATIONS

Li, Jingcong et al., "Priority-based M: N Protection In GMPLS Networks", AEU—International Journal Of Electronics And Communications, Elsevier, Amsterdam, NL, vol. 57, No. 5, Jan. 1, 2003, pp. 341-344, XP001172181.

*Primary Examiner* — Li Liu

(57) ABSTRACT

A transmission apparatus includes a control unit for carrying out processing to secure a resource for a standby system path in response to detection of a sign of failure in an active system path.

4 Claims, 5 Drawing Sheets

(56) References Cited

U.S. PATENT DOCUMENTS

| | | | | |
|---|---|---|---|---|
| 2006/0115266 A1* | 6/2006 | Levi | ............................ | H04L 1/22 |
| | | | | 398/19 |
| 2009/0196598 A1* | 8/2009 | Duan | .................. | H04J 14/0287 |
| | | | | 398/5 |
| 2012/0315030 A1* | 12/2012 | Singh | ..................... | H04L 49/101 |
| | | | | 398/1 |
| 2013/0170825 A1* | 7/2013 | Hu | ........................ | H04B 10/032 |
| | | | | 398/5 |
| 2017/0199026 A1* | 7/2017 | Yin | ......................... | G01B 11/02 |
| 2020/0358548 A1* | 11/2020 | Fabbri | ..................... | H04B 17/24 |

FOREIGN PATENT DOCUMENTS

| | | | | |
|---|---|---|---|---|
| JP | 2003333124 | * | 11/2003 | ............. H04L 29/14 |
| JP | 2003333124 A | | 11/2003 | |
| JP | 2008048213 A | | 2/2008 | |
| JP | 2018032902 A | | 3/2018 | |
| WO | WO2004077701 | * | 9/2004 | |

\* cited by examiner

TRANSMISSION APPARATUS AND TRANSMISSION METHOD

CROSS-REFERENCE TO RELATED APPLICATIONS

This application is a 371 U.S. National Phase of International Application No. PCT/JP2019/030680 filed on Aug. 5, 2019. The entire disclosure of the above application is incorporated herein by reference.

TECHNICAL FIELD

The present invention relates to a transmission apparatus and a transmission method.

BACKGROUND ART

As data communication has increased and traffic types have become more diverse, networks for transferring large volumes of traffic with high reliability are being considered. In the current optical networks, nodes are arranged in a ring or mesh topology. The arrangement allows different paths to be selected even for the same transmission and receiving points.

As a technique for transferring traffic in a highly reliable manner, uninterruptible switching has been introduced in optical networks (see for example, PTL 1). FIG. 5 shows a specific example of a transmission device for an optical network with uninterruptible switching as related art. The uninterruptible switching according to the related art is implemented as follows. Equal numbers of resources are provided in advance for an active system path and a standby system path. On the transmission side, a main signal is copied and sent to the active system path (short path) and the standby system path (long path) both leading to the same receiving point. The main signals arriving at the receiving side through multiple different paths will have a phase difference in the data signals attributable to the path difference. Therefore, a delay is inserted in advance on the short path side. Then, adjustment is made so that the phase difference in the data signals does not occur on the receiving side. When the phase difference in the data signals is zero, the data signal in the active path and the data signal in the standby path are switched at the receiving side. This processing allows the paths to be switched without a bit loss.

CITATION LIST

Patent Literature

[PTL 1] Japanese Patent Application Publication No. 2008-48213

SUMMARY OF THE INVENTION

Technical Problem

In the conventional uninterruptible switching, however, a standby system path in which a data signal has a phase difference matched with that of an active system path must be prepared in advance in addition to the active system path as a normal operation path. Therefore, in the conventional uninterruptible switching, at least the same number of resources as that of the active path must be prepared for the standby path. Therefore, a large number of resources are necessary for communication paths, which makes it difficult to reduce the size of the device and the cost.

With the foregoing in view, it is an object of the present invention to provide a technique which allows necessary resources for a communication path to be reduced in a transmission apparatus capable of carrying out uninterruptible switching.

Means for Solving the Problem

A transmission apparatus according to one aspect of the present invention includes a controller configure to carry out processing to secure a resource for a standby system path in response to detection of a sign of failure in an active system path.

A transmission method according to another aspect of the present invention includes securing a resource for a standby system path in response to detection of a sign of failure in an active system path.

Effect of the Invention

According to the present invention, resources for a communication path can be reduced in a transmission apparatus capable of carrying out uninterrupted switching.

DESCRIPTION OF EMBODIMENTS

Figure 1:
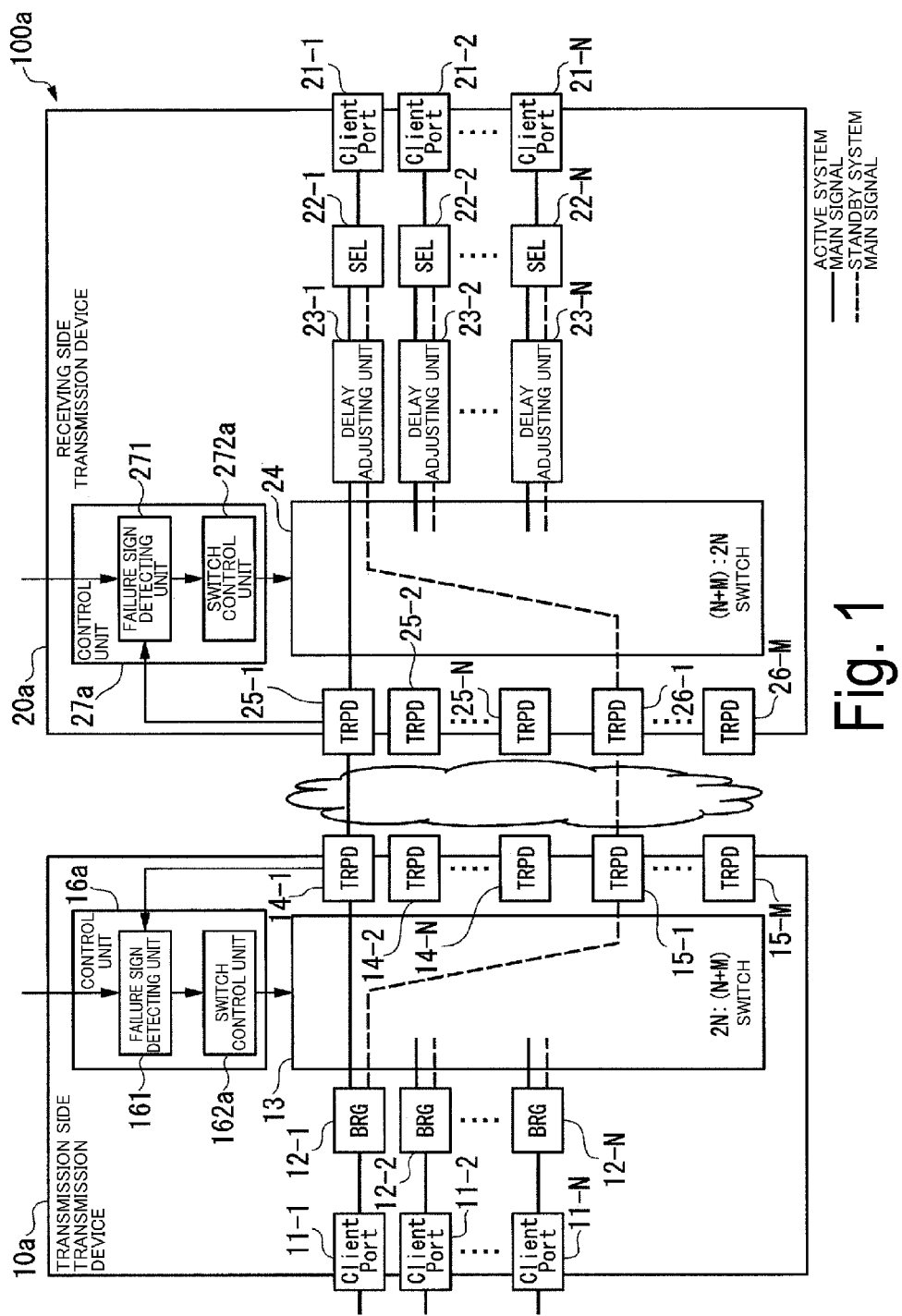
FIG. 1 is diagram of a specific example of the system configuration of a communication system 100a according to a first embodiment of the invention.

A communication system using a transmission device (transmission apparatus) according to an embodiment of the present invention will be described in detail with reference to the drawings.

When a sign of failure is detected in a communication path, the communication system according to the present invention carries out allocation of a standby system path for an active system path with a detected sign of failure and delay adjustment for reducing the delay difference between the active system path and the standby system path to zero. Meanwhile, as for active system paths with no failure sign detection, neither the allocation of a standby system path nor the delay adjustment is performed. The processing eliminates the necessity of reserving the same number of resources for a standby path as for an active path in advance. Therefore, a communication system capable of performing uninterruptible switching with a reduced number of resources can be provided. After the uninterruptible switching is performed, for example, work to repair the part attributable to the failure sign can be performed. The resources in the communication system according to the present invention refer to elements required for the communication system (optical transmission system) such as power, a functional block, a device, a transmission wavelength, an optical amplifier, a relay device. For example, the resources may include an active system communicator 14, a standby system communicator 15, an active system communicator 25, and a standby system communicator 26 which will be described.

Communication systems according to two embodiments of the present invention will be described. In the communication system 100*a* according to a first embodiment of the invention, a sign of failure is detected by a transmission device. In a communication system 100*b* according to a second embodiment of the invention, a sign of failure is detected by a control device rather than the transmission device. As described above, according to the embodiments, a communication system that allows uninterrupted switching can be configured with a reduced number of resources. Specifically, uninterruptible switching is realized in a communication system 100 (100*a*, 100*b*) using N resources for an active system path and M resources for a standby system path. N and M are integers equal to or greater than 1, and M is a value equal to or less than N.

First Embodiment

FIG. 1 is a diagram of a specific example of the system configuration of the communication system 100*a* according to the first embodiment. The communication system 100*a* according to the first embodiment includes a transmission side transmission device 10*a* and a receiving side transmission device 20*a*. The transmission devices provided in the communication system 100*a* will be described.

The transmission side transmission device 10*a* has N client ports 11 (11-1 to 11-N), N bridges 12 (12-1 to 12-N), one 2N:(N+M) switch 13, N active system communicators 14 (14-1 to 14-N), M standby system communicators 15 (15-1 to 15-M), and a control unit (controller) 16*a*. In the drawings, the client port is denoted as "Client Port", the bridge is denoted as "BRG", and the active and standby system communicators are denoted as "TRPD". When N=M, the device may be configured without the switch and the switch control unit.

The client port 11 receives a main signal transmitted from any of other communication devices and information processing and outputs the received main signal to the bridge 12. The bridge 12 functions to receive the main signal from the client port 11, generate copies of the main signal, and output the copies to a plurality of paths. The plurality of paths include at least one active path and at least one standby path. In the example shown in FIG. 1, the bridge 12 outputs the main signal to one active system path and one standby system path. The bridge 12 may output the main signal only to the active path when no sign of failure is detected in the active path (hereinafter referred to as "under normal circumstances"). When a sign of failure occurrence (hereinafter referred to as "sign of failure") is detected in the active system path, the bridge 12 may output the main signal to the active system path and the standby system path.

The 2N:(N+M) switch 13 can switchably connect 2N inputs and (N+M) outputs. The 2N:(N+M) switch 13 on the input side is connected to N bridges 12. The 2N:(N+M) switch 13 is connected to each of the bridges 12 by two paths (an active path and a standby path). The 2N:(N+M) switch 13 on the output side is connected to N active system communicators and M standby system communicators. The 2N:(N+M) switch 13 is connected to each communicator by one path. The 2N:(N+M) switch 13 connects each bridge 12 and each active system communicator 14 as an active system path. It is desirable that the 2N:(N+M) switch 13 does not connect a bridge 12 to a standby system communicator 15 under normal circumstances. The 2N:(N+M) switch 13 connects a particular bridge 12 and a standby system communicator 15 as a standby system path in response to control when there is a sign of failure. The particular bridge 12 to be connected to the standby system communicator 15 upon detecting a sign of failure is the bridge 12 in the active system path with the detected sign of failure.

The active system communicator 14 forms an active system path. The active system communicator 14 transmits a main signal to the receiving side transmission device 20*a* over a network. The active system communicator 14 may include a transponder.

The standby system communicator 15 forms a standby system path. The standby system communicator 15 transmits a duplicated main signal to the receiving side transmission device 20*a* over the network. The standby system communicator 15 may include a transponder.

The control unit 16*a* includes a processor such as a CPU (Central Processing Unit) and a memory. The control unit 16*a* reads and executes a program stored in a storage device to operate as a failure sign detecting unit 161 and a switch control unit 162*a*. The program may be recorded in a computer-readable recording medium. The computer-readable recording medium may be a portable medium such as a flexible disk, a magneto-optical disk, a ROM (Read Only Memory), and a CD-ROM (Compact Disc Read Only Memory) or a non-transitory storage medium, for example a storage device such as a hard disk stored in a computer system. The program may be transmitted through a telecommunication line.

The operation of the control unit 16*a* may be partly or entirely performed by hardware including an electronic circuit (or circuitry) which may include an LSI (Large Scale Integration circuit), an ASIC (Application Specific Integrated Circuit), a PLD (Programmable Logic Device) or an FPGA (Field Programmable Gate Array). The operation of the failure sign detecting unit 161 and the switch control unit 162*a* will be described.

The failure sign detecting unit 161 detects a sign of failure for each active system path. The failure sign detecting unit 161 obtains one or more pieces of information related to such a sign of failure (hereinafter referred to as "failure sign source information"). The failure sign detecting unit 161 may obtain the failure sign source information from each active system communicator 14 or may obtain the failure sign source information over a control network. The failure sign detecting unit 161 may obtain the failure sign source information from the overhead of the main signal. The failure sign source information may be inserted in the overhead of the main signal by another transmission device (for example, the receiving side transmission device 20*a*). The failure sign detecting unit 161 may insert the failure sign source information in the overhead of the received main signal as the failure sign source information for another transmission device (for example, the receiving side transmission device 20*a*). The failure sign information, which will be described, may be inserted in the overhead of the main signal as the failure sign source information.

The failure sign source information is used to detect a sign of failure in the active system path. For example, the failure sign source information may be obtained from devices (devices such as the active system communicator 14 and a DSP for an optical communication) which form the active system path including the transmission side transmission device 10a and the receiving side transmission device 20a. A specific example of such information is physical state data on a communication signal. The failure sign source information may indicate a warning occurring in the transmission side transmission device 10a. The failure sign source information may be about processing performed by the operator of the communication system 100a on the basis of the network operation policy. The failure sign source information may be obtained by combining a plurality of kinds of the above-described information.

The failure sign detecting unit 161 can determine which active path is likely to have a failure using the failure sign source information. The failure sign detecting unit 161 may detect a sign of failure using a learned model obtained by machine learning using the failure sign source information obtained in the past and supervisory data indicating whether a sign of failure has occurred. The failure sign detecting unit 161 may detect a sign of failure by using a trained model obtained by deep learning using the failure sign source information obtained in the past. The failure sign detecting unit 161 may generate failure sign information on the basis of the failure sign source information from the monitoring unit in the device and the failure sign source information received over the control network.

At the time when a sign of failure is detected by the failure sign detecting unit 161, communication of a main signal can still be performed in the active system path. More specifically, although communication of the main signal can continue for a while, the failure sign detecting unit 161 detects a sign of failure when a predetermined condition indicating a sign of failure is satisfied. Upon detecting a sign of failure, the failure sign detecting unit 161 outputs failure sign information to the switch control unit 162a. The failure sign information may include information indicating the active system path (for example, identification information provided to the active system path) for which the sign of failure has been detected.

The switch control unit 162a operates on the basis of the failure sign information. For example, when the switch control unit 162a does not receive the failure sign information, the switch control unit 162a controls the 2N:(N+M) switch 13 to connect the bridge 12 which forms each active system path to an active system communicator 14. When the switch control unit 162a has received the failure sign information, the switch control unit 162a controls the 2N:(N+M) switch 13 to maintain each active system path and to connect the bridge 12 in the active system path with the detected sign of failure and the standby system communicator 15 to form a standby system path for the active system path with the detected sign of failure. At the time, the switch control unit 162a selects and reserves a standby system communicator 15 that is not currently used for main signal communication at that time as the standby system communicator 15 for forming the standby system path. In this case, the 2N:(N+M) switch 13 outputs a standby system main signal to the reserved standby system communicator 15. When a standby system communicator 15 which is not used for main signal communication cannot be reserved, the switch control unit 162a notifies the operator of the situation (for example, as error information).

The receiving side transmission device 20a has N client ports 21 (21-1 to 21-N), N selectors 22 (22-1 to 22-N), N delay adjusting units (delay adjuster) 23 (23-1 to 23-N), one (N+M):2N switch 24, N active system communicators 25 (25-1 to 25-N), M standby system communicators 26 (26-1 to 26-M), a failure sign detecting unit 161, and a switch control unit 162a. In the drawings, the client port is denoted as "Client port", the selector is denoted as "SEL", and the active system communicator and the standby system communicator are denoted as "TRPD".

The client port 21 transmits a main signal output from the selector 22 to other communication devices and for information processing. The selector 22 outputs a main signal output from the delay adjusting unit 23 to the client port 21. Upon receiving the main signal from the delay adjusting unit 23 through one path (either through the active system path or the standby system path), the selector 22 outputs the main signal to the client port 21. Meanwhile, upon receiving the main signal from the delay adjusting unit 23 through multiple paths (for example from both the active system path and the standby system path), the selector 22 outputs the main signal in one of the paths to the client port 21.

The delay adjusting unit 23 performs delay adjustment for a main signal output from the (N+M):2N switch 24. For example, when a plurality of main signals are output from the (N+M):2N switch 24, the delay adjusting unit 23 carries out delay adjustment to adjust the delay difference among the plurality of main signals substantially to zero. For example, the delay adjustment may be performed so that the delay difference among the plurality of main signals is smaller than a predetermined threshold.

The (N+M):2N switch 24 switchably connects the (N+M) inputs and the 2N outputs. The output side of the (N+M):2N switch 24 is connected to the N delay adjusting units 23. The (N+M):2N switch 24 is connected to each of the N delay adjusting units 23 by two paths (the active system path and the standby system path). The input side of the (N+M):2N switch 24 is connected to N active system communicators and M standby system communicators. The (N+M):2N switch 24 is connected to each communicator by a single path. The (N+M):2N switch 24 is connected to each of the delay adjusting units 23 and each of the active system communicators 25 as an active system path. It is desirable that the (N+M):2N switch 24 does not connect the delay adjusting unit 23 and the standby system communicator 26 under normal circumstances. The (N+M):2N switch 24 connects a particular delay adjusting unit 23 and a standby system communicator 26 as a standby system path according to control when there is a sign of failure. The particular delay adjusting unit 23 connected to the standby system communicator 26 at the time of the sign of failure is the delay adjusting unit 23 in the active system path with the detected sign of failure. The (N+M):2N switch 24 outputs a main signal from the active system and a main signal from the standby system to the delay adjusting unit 23 associated with the client port 21 according to destination information included in the overhead of the main signal.

The active system communicator 25 forms an active system path. The active system communicator 25 receives a main signal from the transmission side transmission device 10a over a network. The active system communicator 25 outputs the received main signal to the (N+M):2N switch 24. The active system communicator 25 may include a transponder.

The standby system communicator 26 forms a standby system path. The standby system communicator 26 receives a duplicated main signal from the transmission side transmission device 10a over the network. The standby system communicator 26 outputs the received main signal to the (N+M):2N switch 24. The standby system communicator 26 may include a transponder. In this way, when there is failure sign information, the main signal passes through both the active system path and the standby system path and is transmitted from the transmission side transmission device 10a to the receiving side transmission device 20a.

The control unit 27a includes a processor such as a CPU and a memory. The control unit 27a reads and executes a program stored in a storage device to operate as the failure sign detecting unit 271 and the switch control unit 272a. The program may be recorded in a computer-readable recording medium. The computer-readable recording medium may be a portable medium such as a flexible disk, a magneto-optical disk, a ROM, and a CD-ROM, or a non-transitory storage medium, for example a storage device such as a hard disk built in a computer system. The program may be transmitted through a telecommunication line.

The operation of the control unit 27a may be performed partly or entirely by hardware including an electronic circuit which may include an LSI, an ASIC, a PLD, or an FPGA. The operation of the failure sign detecting unit 271 and the switch control unit 272a will be described.

The failure sign detecting unit 271 detects a sign of failure for each active system path. The failure sign detecting unit 271 obtains one or more pieces of information (failure sign source information) related to such a sign of failure. The failure sign detecting unit 271 may obtain the failure sign source information from each active system communicator 25 or may obtain the failure sign source information over the control network. The failure sign detecting unit 271 may obtain the failure sign source information from the overhead of a main signal. The overhead of the main signal may include the failure sign source information inserted by another transmission device (for example, the transmission side transmission device 10a). The failure sign detecting unit 271 may insert the failure sign source information in the overhead of the received main signal as the failure sign source information for another transmission device (for example, the transmission side transmission device 10a). The failure sign information may be inserted in the overhead of the main signal as failure sign source information.

Using the failure sign source information, the failure sign detecting unit 271 can determine which active system path has the possibility of a failure. A specific example of the processing by the failure sign detecting unit 271 is the same as the that of the failure sign detecting unit 161, and therefore the description is not provided.

The switch control unit 272a operates according to the failure sign information. For example, when the switch control unit 272a does not receive the failure sign information, the switch control unit 272a controls the (N+M):2N switch 24 so as to connect a delay adjusting unit 23 and an active system communicator 25 which form each active system path. When the switch control unit 272a receives the failure sign information, the switch control unit 272a controls the (N+M):2N switch 24 to maintain each active system path and to connect the delay adjusting unit 23 in the active system path with the detected sign of failure to the standby system communicator 26 in order to form a standby system path for the active system path with the detected sign of failure. At the time, the switch control unit 272a selects and reserves a standby system communicator 26 which is not currently used for main signal communication at the time as the standby system communicator 26 for forming a standby system path. In this case, the (N+M):2N switch 24 outputs the standby system main signal to the reserved standby system communicator 26. When a standby system communicator 26 which is not currently used for main signal communication cannot be reserved, the switch control unit 272a notifies the operator of the situation (for example, as error information).

Upon detecting a sign of failure, the failure sign detecting unit 271 executes delay adjusting processing to adjust the delay difference between the main signals to zero. More specifically, the delay adjusting processing by the delay adjusting unit 23 is completed before switching between the active and the standby system paths is performed. After the delay difference has been adjusted substantially to zero, when the situation about the sign of failure has been cleared (if the sign of failure is no longer detected), the main signal continues to be transmitted in the active system path. At the time, the switch control units 162a and 272a maintain the connection of the active system path. At the time, the resources for the standby system path may be released, so that the standby system resources (for example, a standby system communicator) may be returned to the state to be available for the transmission of other main signals. When the failure sign information has not been cleared or when there is an instruction from the operator to switch, the selector 22 switches the path between the active and the standby system paths. This switching allows uninterrupted switching to be carried out. The selector 22 outputs the main signal after the switchover to the client port 21. The processing allows restoration work to be performed upon the part of the active system path with the detected sign of failure. In addition, while sharing resources for the standby system path, uninterrupted switching can be carried out with 2N or fewer number of resources for the standby system path. Therefore, for example, the number of standby system communicators 15 or 26 may be equal to or less than those of the conventional case.

Figure 2:
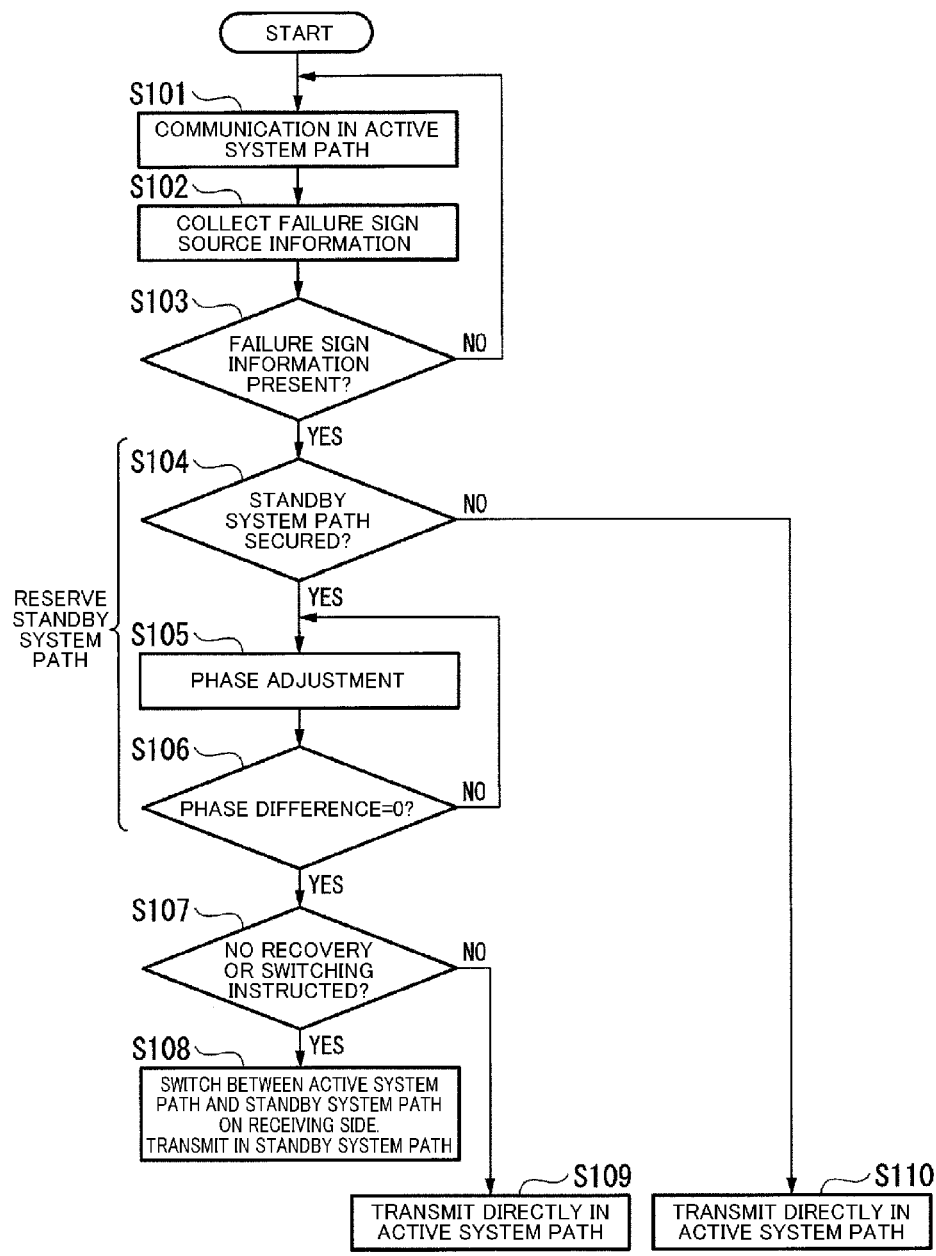
FIG. 2 is a flowchart for illustrating a specific example of the flow of operation of the communication system 100a according to the first embodiment.

FIG. 2 is a flowchart for illustrating a specific example of the flow of operation by the communication system 100a according to the first embodiment. Under normal circumstances, a main signal is communicated in an active system path (active system path) (step S101). The failure sign detecting units 161 and 271 continuously collect failure sign source information (step S102). When it is determined on the basis of failure sign source information that no sign of failure is detected (No in step S103), the system returns to step S101 and communication in the active system path is continued.

Meanwhile, when a sign of failure is detected (Yes in step S103), the switch control units 162a and 272a control the 2N:(N+M) switch 13 and the (N+M):2N switch 24, respectively to secure a standby system path (standby system path). When all the standby system communicators 15 are in use or all the standby system communicators 26 are in use, the switch control units 162a and 272a cannot secure a standby system path (No in step S104). In this case, the main signal continues to be communicated in the active system path (step S110). Then, the switch control units 162a and 272a release each resource reserved for the standby system path in step S104.

When a standby system path can be secured in step S104 (Yes in step S104), the switch control units 162a and 272a start communication of a main signal in the standby system path while maintaining communication of the main signal in the active system path. The specific operation is as follows. The switch control unit 162a controls the 2N:(N+M) switch 13 to form a standby system path corresponding to the active system path with the detected sign of failure. More specifically, the switch control unit 162a controls the 2N:(N+M) switch 13 to cause the output of the bridge 12 in the active system path with the detected sign of failure to be connected to the standby system communicator 15. The switch control unit 272*b* also controls the (N+M):2N switch 24 in the same way to form a standby system path corresponding to the active system path with the detected sign of failure. More specifically, the switch control unit 272*a* controls the (N+M):2N switch 24 to connect the output of the standby system communicator 26, which receives the main signal sent from the standby system communicator 15 of the transmission side transmission device 10*b*, to the delay adjusting unit 23 in the active system path with the detected sign of failure. The information indicating which standby system communicator 15 transmits the main signal may be obtained from the transmission side transmission device 10*a*, for example, over the control network.

In response to the above operation of the switch control units 162*a* and 272*a*, a standby system path from the transmission side transmission device 10*a* to the receiving side transmission device 20*a* is established. Thereafter, the main signal is transmitted through the standby system path, and the main signal reaches the delay adjusting unit 23. The delay adjusting unit 23 performs delay adjusting processing (phase adjustment) to the main signal transmitted through the active system path and the main signal transmitted through the standby system path (step S105). The delay adjusting unit 23 continues the delay adjusting processing until the delay difference between the two main signals becomes substantially zero (No in step S106). Through the delay adjusting processing, the delay difference between the main signal transmitted in the active system path and the main signal transmitted in the standby system path is reduced substantially to zero.

The failure sign detecting units 161 and 271 continue to detect a sign of failure. After the delay difference becomes substantially zero (Yes in step S106), when there is no sign of failure detected (No in step S107), the main signal continues to be transmitted in the active system path (step S109). This is when a sign of failure is no longer detected, more specifically, when a sign of failure has been cleared. The processing in step S109 may also be performed when the operator (administrator) gives an instruction not to switch. In this case, the resources for the standby system path are released, and the resources for the standby system path (for example, a standby system communicator) may be returned to a state to be available for transmission of other main signals.

After the delay difference is reduced substantially to zero (Yes in step S106), when a sign of failure is still detected (Yes in step S107), switching between the active system path and the standby system path is performed at the receiving side transmission device 20*a*. Then, the main signal starts to be transmitted using only the standby path (step S108). More specifically, transmission of the main signal in the active system path with the detected sign of failure is stopped. This switching between the active and the standby system paths may be performed when the operator (administrator) gives an instruction to switch. After the switching between the active and standby system paths is performed in this manner, the cause of the sign of failure is investigated and the failure in the active system path with the detected sign of failure can be repaired.

Figure 3:
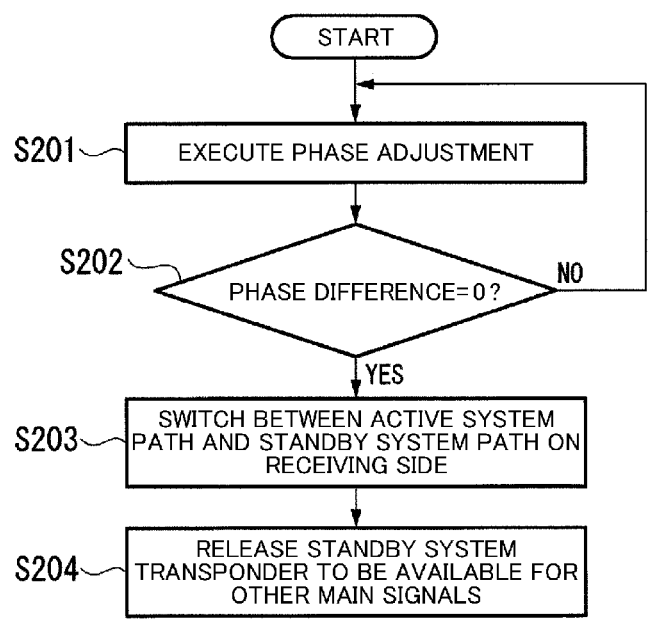
FIG. 3 is a flowchart for illustrating a specific example of the flow of processing when a transmission path for a main signal is returned from a standby system path to an active system path after repair of the active system path is completed.

FIG. 3 is a flowchart for illustrating a specific example of the flow of processing when the transmission path for the main signal is switched back to the active system path from the standby system path after the repair of the active system path is completed. When an instruction to switch to the active system path is input from the operator, the delay adjusting unit 23 performs delay adjusting processing (phase adjustment) for the main signal transmitted through the active system path and the main signal transmitted through the standby system path (step S201). The delay adjusting unit 23 continues the delay adjusting processing until the delay difference between the two main signals becomes substantially zero (No in step S202). By performing this delay adjusting processing, the delay difference between the main signal transmitted through the active system path and the main signal transmitted through the standby system path becomes substantially zero.

After the delay difference is reduced substantially to zero (Yes in step S202), the receiving side transmission device 20*a* switches between the active system path and the standby system path (step S203). Thereafter, the main signal starts to be transmitted using only the active system path. More specifically, transmission of the main signal using the active system path cleared of the sign of failure resumes. After such a switchover from the standby system path to the active system path, the switch control units 162*a* and 272*a* release the resources used for the standby system path. For example, the switch control units 162*a* and 272*a* release the 15 standby system communication units and the 26 standby system communication units by controlling the 2N:(N+M) switch 13 and the (N+M):2N switch 24 (Step 204). The released standby system communicators 15 and 26 can be used for a standby system path for another active system path.

In the communication system 100*a* having the configuration, when a sign of failure is detected in an active system path, a standby system path is formed for the active system path with a detected sign of failure. In this case, the standby system path is formed using a resource (a standby system communicator) in the standby system path shared among other active system paths. Then, the delay adjusting processing is performed to reduce the delay difference between the formed standby system path and the active system path with the detected sign of failure to zero. Meanwhile, for the active system paths for which no detected sign of failure, no standby system path is assigned or no delay adjusting processing is performed. Through the processing, there is no need to secure the same number of resources for the standby paths as for the active paths in advance. Therefore, a communication system that can perform uninterruptible switching with a reduced number of resources can be configured. After the uninterruptible switching is performed, work to repair the part attributable to the sign of failure can be performed. Then, the used resources for the standby system path can be released by switching from the standby system path to the active system path again. Therefore, a new standby system path can be formed when a new sign of failure occurs.

Modifications

According to the embodiment, redundancy is achieved by constructing one active system path and one standby system path. However, the number of redundancies does not have to be two. For example, at least three copies of a main signal may be made, so that triplication or quadruplication may be realized. In such a case, it is only necessary to reserve (secure) a number of resources according to the number of multiplications from the resources for the standby system path (for example, a standby system communicator) which are not used for transmission of the main signal.

In the above-described example, the transmission side transmission device 10*a* and the receiving side transmission device 20*a* are connected on a one-to-one basis. However, the transmission side transmission device 10*a* and the receiving side transmission device 20*a* do not have to be connected in such a one-to-one manner. For example, one transmission side transmission device 10*a* may be connected to a plurality of opposing receiving side transmission devices 20*a* to transmit a main signal.

Second Embodiment

Figure 4:
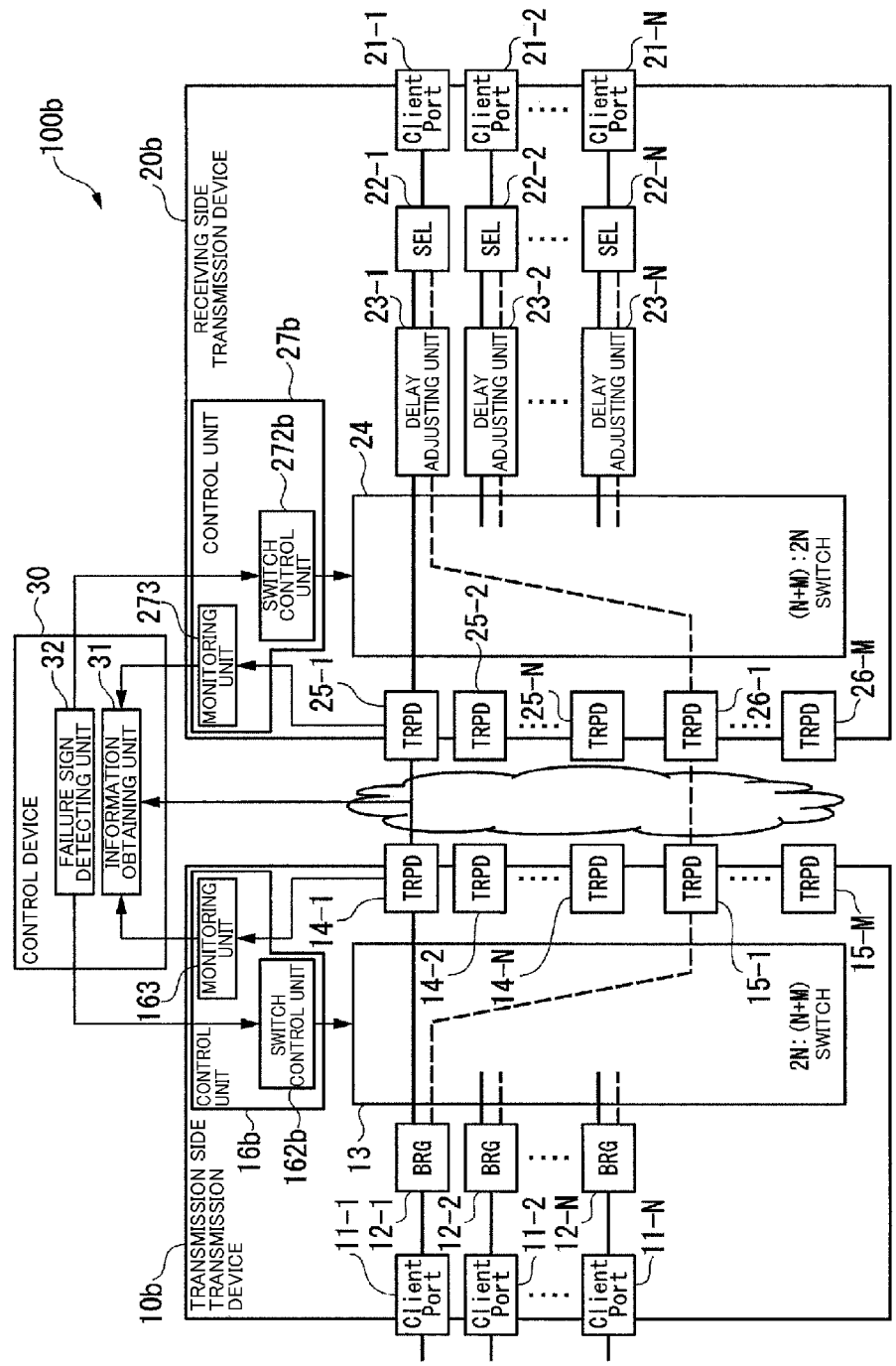
FIG. 4 is a diagram of a specific example of the system configuration of a communication system 100b according to a second embodiment of the invention.
Figure 5:
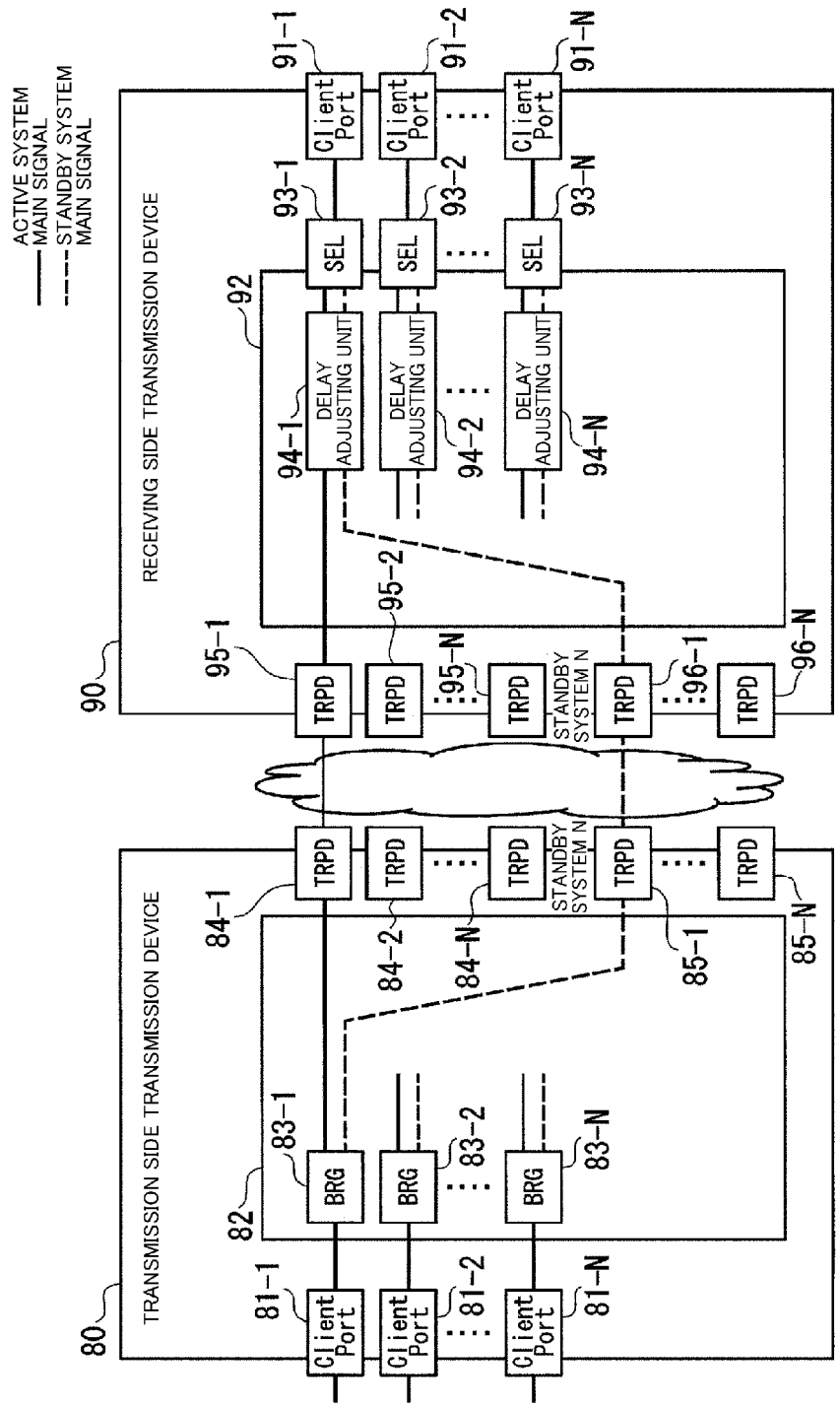
FIG. 5 is a diagram of a specific example of a transmission device for an optical network with uninterruptible switching according to the related art.

FIG. 4 is a diagram of a specific example of the system configuration of the communication system 100*b* according to a second embodiment of the invention. The communication system 100*b* according to the second embodiment includes a transmission side transmission device 10*b*, a receiving side transmission device 20*b*, and a control device 30. Hereinafter, the devices of the communication system 100*b* will be described.

The transmission side transmission device 10*b* has N client ports 11 (11-1 to 11-N), N bridges 12 (12-1 to 12-N), one 2N:(N+M) switch 13, N active system communicators 14 (14-1 to 14-N), M standby system communicators 15 (15-1 to 15-M), and a control unit 16*b*. In the drawings, the client port is denoted as "Client Port", the bridge is denoted as "BRG", and the active and standby system communicators are denoted as "TRPDs".

The transmission side transmission device 10*b* has the same configuration as the transmission side transmission device 10*a* according to the first embodiment except for the configuration of the control unit 16*b*. The control unit 16*b* functions as a switch control unit 162*b* and a monitoring unit 163. Therefore, only the switch control unit 162*b* and the monitoring unit 163 will be described as for the transmission side transmission device 10*b* according to the second embodiment.

The switch control unit 162*b* is different from the switch control unit 162*a* according to the first embodiment in that the switch control unit 162*b* does not receive failure sign information from the failure sign detecting unit 161 of its own device but from any of other devices. In other respects, the configuration of the switch control unit 162*b* is the same as that of the switch control unit 162*a* according to the first embodiment.

The monitoring unit 163 obtains failure sign source information. The method of how the monitoring unit 163 obtains the failure sign source information may be the same as that of the failure sign detecting unit 161 according to the first embodiment. The monitoring unit 163 transmits the obtained failure sign source information to the control device 30.

The transmission side transmission device 10*b* has N client ports 11 (11-1 to 11-N), N bridges 12 (12-1 to 12-N), one 2N:(N+M) switch 13, N active system communicators 14 (14-1 to 14-N), M standby system communicators 15 (15-1 to 15-M), the switch control unit 162*b*, and the monitoring unit 163. In the drawings, the client port is denoted as "Client Port", the bridge is denoted as "BRG", and the active and standby system communicators are denoted as "TRPDs".

The receiving side transmission device 20*b* has the same configuration as the receiving side transmission device 20*a* according to the first embodiment except for the configuration of the switch control unit 272*b* and the monitoring unit 273. Therefore, only the switch control unit 272*b* and the monitoring unit 273 will be described for the receiving side transmission device 20*b* according to the second embodiment.

The switch control unit 272*b* is different from the switch control unit 272*a* according to the first embodiment in that the switch control unit 272*b* does not receive the failure sign information from the failure sign detecting unit 271 of its own device but from any of other devices. In other respects, the configuration of the switch control unit 272*b* is the same as that of the switch control unit 272*a* according to the first embodiment.

The monitoring unit 273 obtains failure sign source information. The method of how the monitoring unit 273 obtains the failure sign source information may be the same as that of the failure sign detecting unit 271 according to the first embodiment. The monitoring unit 273 transmits the obtained information on the failure sign source to the control device 30.

The monitoring unit 163 of the transmission side transmission device 10*b* and the monitoring unit 273 of the receiving side transmission device 20*b* each include a processor such as a CPU and a memory. The monitoring unit 163 and the monitoring unit 273 read and execute a program stored in a storage device to operate. The program may be recorded in a computer-readable recording medium. The computer-readable recording medium may be a portable medium such as a flexible disk, a magneto-optical disk, a ROM, and a CD-ROM or a non-transitory storage medium, for example a storage device such as a hard disk built in a computer system. The program may be transmitted through a telecommunication line. The operation of the monitoring unit 163 and the monitoring unit 273 may be performed partly or entirely by hardware including an electronic circuit which may include an LSI, an ASIC, a PLD, or an FPGA.

Now, the control device 30 will be described. The control device 30 may include an information processing device such as a server device, a personal computer, and a mainframe. The control device 30 functions as an information obtaining unit 31 and a failure sign detecting unit 32. The information obtaining unit 31 and the failure sign detecting unit 32 each includes a processor such as a CPU and a memory. The information obtaining unit 31 and the failure sign detecting unit 32 read and execute a program stored in a storage device to operate. The program may be recorded in a computer-readable recording medium. The computer-readable recording medium may be a portable medium such as a flexible disk, a magneto-optical disk, a ROM, and a CD-ROM or a non-transitory storage medium, for example a storage device such as a hard disk built in a computer system. The program may be transmitted through a telecommunication line. The operation of the information obtaining unit 31 and the failure sign detecting unit 32 may be performed partly or entirely by hardware including an electronic circuit which may include an LSI, an ASIC, a PLD, or an FPGA.

The information obtaining unit 31 receives the failure sign source information transmitted from the monitoring unit 163 of the transmission side transmission device 10*b* and the failure sign source information transmitted from the monitoring unit 273 of the receiving side transmission device 20*b*. The information obtaining unit 31 may also obtain the failure sign source information from a communication device which forms a communication path between the active system communicator 14 and the active system communicator 25. The information obtaining unit 31 outputs the obtained failure sign source information to the failure sign detecting unit 32. The control device 30 includes a communication device which is not shown. Using the communication device, the information obtaining unit 31 and the failure sign detecting unit 32 communicate with the transmission side transmission device 10*b* and the receiving side transmission device 20*b*.

The failure sign detecting unit 32 detects a sign of failure in each active system path by performing the same processing as the processing carried out by the failure sign detecting units 161 and 271. Upon detecting a sign, the failure sign detecting unit 32 transmits failure sign information to the switch control unit 162b of the transmission side transmission device 10b and the switch control unit 272b of the receiving side transmission device 20b. The failure sign information includes information indicating that the sign has been detected and information indicating the active system path with the detected sign.

The flow of operation in the communication system 100b according to the second embodiment is basically the same as the flow of operation in the communication system 100a according to the first embodiment. Therefore, a description of the flowchart with reference to FIGS. 2 and 3 will not be provided.

In the communication system 100b according to the second embodiment having the above configuration, the same effects as those brought about by the communication system 100a according to the first embodiment can be obtained as follows.

In the communication system 100b having the configuration, when a sign of failure is detected in an active system path, a standby system path is formed for the active system path with the detected sign. In this case, the standby system path is formed using a resource (a standby system communicator) for the standby system path shared among other active system paths. Then, delay adjusting processing is performed to reduce the delay difference between the formed standby system path and the active system path with the detected sign of faire to zero. Meanwhile, for the active system paths with no detected sign of failure, neither standby system path assignment nor delay adjusting processing is performed. Through the processing, there is no need to prepare equal of numbers of resources for the standby paths and the active paths in advance. Therefore, the communication system can perform uninterruptible switching with a reduced number of resources. After the uninterruptible switching is performed, work to repair the part attributable to the sign of failure can be performed. Then, the standby system path is switched to the active system path again, so that the used resources of the standby system path can be released. Therefore, a new standby system path can be formed when a new sign of failure is encountered.

Modifications

According to the second embodiment, redundancy is achieved by constructing one active system path and one standby system path. However, the number of redundancies does not have to be two. For example, at least three copies of a main signal may be made, so that triplexing or quadruplexing may be realized. In this case, it is only necessary to reserve (secure) a number of resources according to the number of multiplications from the resources for the standby system path (for example, a standby system communicator) which are not used for transmission of the main signal.

The embodiments of the invention have been described in detail with reference to the drawings, but specific configurations are not limited by the embodiments and may include designs which do not depart from the gist of the present invention.

INDUSTRIAL APPLICABILITY

The present invention is applicable to communication using an active system path and a standby system path.

REFERENCE SIGNS LIST 100a, 100b Communication system
10a, 10b Transmission side transmission device
11 Client port
12 Bridge
13 2N:(N+M) switch
14 Active system communicator
15 Standby system communicator
16a, 16b Control unit
161 Failure sign detecting unit
162a, 162b Switch control unit
163 Monitoring unit
20a, 20b Receiving side transmission device
21 Client port
22 Selector
23 Delay adjusting unit
24 (N+M):2N switch
25 Active system communicator
26 Standby system communicator
27a, 27b Control unit
271 Failure sign detecting unit
272a, 272b Switch control unit
273 Monitoring unit
30 Control device
31 Information obtaining unit
32 Failure sign detecting unit

The invention claimed is:
1. A transmission apparatus comprising:
a resource for an active system path;
a resource for a standby system path;
a controller configured to carry out processing to secure the resource for the standby system path in response to detection of a sign of failure in the active system path; and
a switch configured to connect a transmission path for a main signal to the resource for the active system path or the resource for the standby system path;
wherein, the resource for the active system path is an active system communicator,
the resource for the standby system path is a standby system communicator,
the resource for the standby system path is shared among a plurality of active system paths,
the number of resources for the active system path is more than the number of resources for the standby system path, and
the switch connects some of the active system paths and the resource for the standby system path, so that a duplicated main signal is transmitted to the standby system path from the active system path with the detected sign of failure,
a failure sign source information is used to detect the sign of failure, and
the failure sign source information includes at least one of:
first information indicating a warning occurring in the transmission apparatus, and
second information being about a processing performed, by an operator of a communication system, based on a network operation policy, and
upon detecting the sign of failure, a delay adjuster configured to adjust delay difference in the active system path and the standby system path substantially to zero, and after the delay difference is reduced to zero, when the sign of failure is still detected, switching between the active system path and the standby system path is performed.

2. The transmission apparatus according to claim 1, further comprising a selector configured to receive a main signal received through the active system path and a main signal received through the standby system path and outputs one of the main signals.

3. A transmission method comprising
providing a resource for an active system path, where the resource for the active system path is an active system communicator;
providing a resource for a standby system path, where the resource for the standby system path is a standby system communicator, and the resource for the standby system path is shared among a plurality of active system paths and the number of resources for the active system path is more than the number of resources for the standby system path;
providing a switch that connects a transmission path for a main signal to the resource for the active system path or the resource for the standby system path;
receiving, by a controller, a sign of failure in the active system path; and
in response to receiving the sign of failure in the active system path, connecting, by the controller, the resource for the standby system path and a subset of the active system paths in the plurality of active system paths via the switch, such that a duplicated main signal is transmitted to the standby system path from the active system path with the detected sign of failure, adjusting delay difference in the active system path and the standby system path substantially to zero;
wherein, after the delay difference is reduced to zero, when the sign of failure is still detected, switching between the active system path and the standby system path is performed; and
a failure sign source information is used to detect the sign of failure, and
the failure sign source information includes at least one of:
first information indicating a warning occurring in the transmission apparatus, and
second information being about a processing performed, by an operator of a communication system, based on a network operation policy.

4. The transmission method according to claim 3, further comprising receiving a main signal received through the active system path and a main signal received through the standby system path and outputting one of the main signals.

* * * * *